(12) United States Patent
Verhaar

(10) Patent No.: US 6,975,921 B2
(45) Date of Patent: Dec. 13, 2005

(54) GRAPHICAL REPRESENTATION OF A WAFER PROCESSING PROCESS

(75) Inventor: Nico A. H. Verhaar, Bilthoven (NL)

(73) Assignee: ASM International NV, Bilthoven (NL)

(*) Notice: Subject to any disclaimer, the term of this patent is extended or adjusted under 35 U.S.C. 154(b) by 929 days.

(21) Appl. No.: 10/033,058

(22) Filed: Nov. 9, 2001

(65) Prior Publication Data

US 2003/0090522 A1 May 15, 2003

(51) Int. Cl.[7] .............................. G06F 7/00; G06T 11/20
(52) U.S. Cl. ....................... 700/228; 345/440; 715/772; 414/222.01
(58) Field of Search ................................ 700/121, 228; 715/772; 414/222.01; 438/908; 345/440

(56) References Cited

U.S. PATENT DOCUMENTS

| | | | |
|---|---|---|---|
| 5,818,716 A | * | 10/1998 | Chin et al. ................... 700/100 |
| 5,852,445 A | * | 12/1998 | Yoshikawa et al. .......... 345/440 |
| 5,880,980 A | * | 3/1999 | Rothacher et al. .......... 708/313 |
| 6,099,598 A | | 8/2000 | Yokoyama |
| 6,230,068 B1 | | 5/2001 | Wu et al. |
| 6,587,108 B1 | * | 7/2003 | Guerlain et al. ............. 345/440 |

* cited by examiner

Primary Examiner—Leo Picard
Assistant Examiner—Sheela S. Rao
(74) Attorney, Agent, or Firm—Allen J. Moss; Squire, Sanders & Dempsey L.L.P.

(57) ABSTRACT

A method for graphically representing the progress of wafers being processed in a plurality of process stations is disclosed. In one step, the start of a process performed on the wafers in one of the plurality of process stations is determined. Then, the generation of a first line segment parallel to a first axis is initiated. Next, the end of the process in one of the plurality of process stations is determined. Then the generation of the first line segment parallel to the first axis is terminated. The start of a transfer of the wafers from one of the plurality of process stations to another one of the plurality of process stations is detected in a next step. Then, the formation of a second line segment connected with the first line segment and substantially perpendicular to the first axis is initiated. The completion of the transfer of the wafers is then determined and the formation of the second line segment perpendicular to the first axis is terminated. The process is then repeated for each process station until the wafers have been processed through all the process stations.

38 Claims, 3 Drawing Sheets

GRAPHICAL REPRESENTATION OF A WAFER PROCESSING PROCESS

TECHNICAL FIELD

This invention relates to the field of semiconductor manufacturing and more specifically to a method of graphical representation of a wafer processing process.

BACKGROUND OF THE INVENTION

In automated fabrication plants or inside a complex wafer-processing tool, work pieces travel from one process station to another. At these process stations various operations are performed on the work pieces. Some process stations perform operations on the work pieces for a longer period of time than other process station. Also, some process stations are able to operate on a larger number of work pieces than other process stations. Additionally, the time taken to transfer the work pieces between process stations is an important fabrication parameter. One difficulty in monitoring the progress of work pieces in fabrication plants is that information involving plant processes is not provided in a manner that allows an operator to quickly visualize plant or tool parameters in an easy to use and efficient manner. Also, there are no simple ways to use simulated data, either generated by a simulation machine or generated using knowledge of plant parameters, to produce a visual representation of a processing process for planning purposes.

To overcome this problem, different process visualization schemes have been proposed. One scheme is disclosed in U.S. Pat. No. 6,099,598 issued to Yokoyama on Aug. 8, 2000. This invention discloses a method of displaying a semiconductor manufacturing process. The display shows the transportation of a semiconductor wafer and the processing of the semiconductor wafer on a horizontal line. Additional wafers are illustrated on other horizontal lines, one line on top of another. This approach, however, makes it difficult to see what process station the wafer is in. Additionally, it does not give an indication of the quantity of wafers in a process station.

Another scheme is detailed in U.S. Pat. No. 6,230,068 and issued to Wu et al on May 8, 2001. This patent discloses the collection of data from different stages of a process line. The data from each stage is placed on a bar chart. The bar charts are arranged in pairs representing process steps. However, these charts do not indicate what process station a work piece is in, do not indicate when work pieces are transferred and do not indicate the quantity of work pieces at each process station at a given time.

In view of the problem, described above, the need remains for a graphical representation of a processing process that provides a simple way to determine plant parameters.

SUMMARY OF THE INVENTION

Thus, a need has arisen for a method and system to produce a graphical representation of a wafer processing process that overcomes disadvantages associated with other graphical representations.

In one embodiment, a method for graphically representing the progress of wafers being processed in a plurality of process stations is disclosed. In one step, the start of a process performed on the wafers in one of the plurality of process stations is determined. Then, the generation of a line segment parallel to a first axis is initiated. Next, the end of the process in one of the plurality of process stations is determined. Then the generation of the line segment parallel to the first axis is terminated. The start of a transfer of the wafers from one of the plurality of process stations to another one of the plurality of process stations is detected in a next step. Then, the formation of a line segment substantially perpendicular to the first axis is initiated. The completion of the transfer of the wafers is then determined. The formation of the line segment perpendicular to the first axis is terminated. The process is then repeated for each process station until the wafers have been processed through all the process stations.

In another embodiment, a display for displaying a graphical representation of a process involving a plurality of process stations in the manufacture of one or more work pieces is provided. The display includes a graph area to display the graphical representation. The graphical representation includes a plurality of line segments in a first direction. The length of the line segments in the first direction indicates the time one or more work pieces spend in one of the plurality of process stations. Also, the graphical representation includes a plurality of line segments in a second direction. The line segments in the second direction connect the line segments in the first direction. Also, the line segments in the second direction represent the transfer of one or more work pieces from one of the plurality of process stations to another one of the plurality of process stations.

In another embodiment, a manufacturing system is disclosed. The manufacturing system includes a process tool having a plurality of process stations that perform manufacturing steps on a plurality of work pieces. The manufacturing system includes a controller coupled to the process tool to send control commands to the process tool. A display is coupled to the controller. The display receives data from the controller regarding the processing of the plurality of work pieces in the process tool. The display includes a display area to display a graphical representation of the processing of the work pieces. The graphical representation includes a plurality of line segments in a first direction. The length of the line segments in the first direction indicates the time one or more work pieces spend in one of the plurality of process stations. Also, the graphical representation includes a plurality of line segments in a second direction. The line segments in the second direction connect the line segments in the first direction. Also, the line segments in the second direction represent the transfer of one or more work pieces from one of the plurality of process stations to another one of the plurality of process stations.

Also, a program product for displaying a graphical representation of a process is provided. The program product includes a computer readable storage medium for storing instructions that, when executed by a computer causes the computer to perform a method for generating a graphical representation of a processing system in which one or more work pieces are processed in a number of process stations. The program product includes computer readable program code for forming a first line segment in a first direction, the first line segment indicating the time one or more work pieces spend in a first process station. Also included is computer readable program code for forming a second line segment connected to the first line segment in a second direction, the second line segment representing the transfer of the one or more work pieces from the first process station to a second process station.

Technical benefits of the present invention include forming a graphical representation of a process that shows both the time a work piece is in a process station and the transfer of work piece from station to station. Other technical benefits are apparent from the following descriptions, illustrations and claims.

BRIEF DESCRIPTION OF THE DRAWINGS

Non-limiting and non-exhaustive preferred embodiments of the present invention are described with references to the following figures wherein like reference numerals refer to like parts throughout the various views unless otherwise specified.

DETAILED DESCRIPTION OF THE PREFERRED EMBODIMENTS

A method of the present invention includes a method to display data from a system in which one or more work pieces undergo different processing steps in a number of different processing stations. The method can be used in any one of a number of systems where work pieces are processed in different processing stations. The example presented in the following figures are for illustrative purposes only and are not intended to limit the application of the present invention to such examples.

Figure 1:
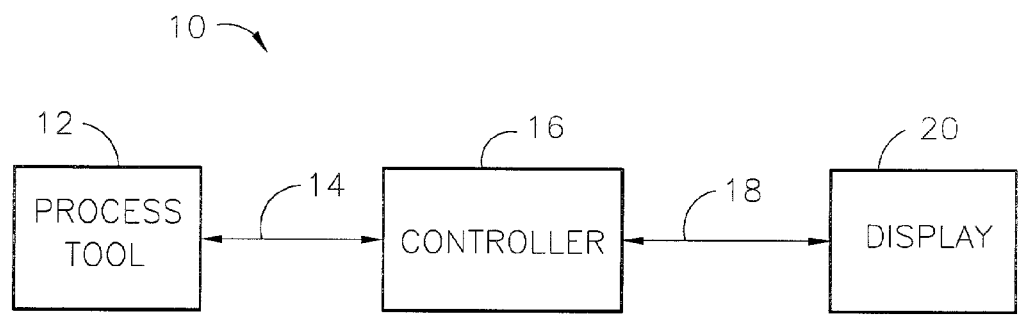
FIG. 1 is a block diagram of a manufacturing system.

For example, FIG. 1 is a block diagram of a manufacturing system 10 in accordance with the teachings of the present invention. Manufacturing system 10 includes a process tool 12 coupled to a controller 16 via input/output line 14 and a display 20 coupled to the controller 16 via input/output line 18.

Processing tool 12 may be any tool wherein a work piece, such as a semiconductor wafer, undergoes multiple processing steps. Each of the processing steps performed by processing tool 12 will typically be performed in a processing station that is provided as part of the process tool 12.

Controller 16 can be any device capable of sending commands to processing tool 12 in order to control the operation and functionality of processing tool 12. Controller 16 may include a memory for storing a processing tool control program and a processor for executing the process tool control program. Controller 16 may be a proprietary device or may be implemented using a general-purpose computer. An example of a general purpose computer is a personal computer based on an INTEL processor such as the PENTIUM family of processors and running an operating system such as DOS, OS2, or Windows 3.1, 95, 98, ME, NT, 2000, XP or the like. Such a general-purpose computer could interface with additional controllers within processing tool 12. Controller couples processing tool 12 via input/output line 14. Input/output line 14 can be any type of data connection, wired or wireless.

Display 20 couples to controller 16 via input/output line 18 and receives information regarding the processing of a work piece in process tool 12. Display 20 can then display a novel graphical representation of the progress of the processing of the work piece in process tool 12 as further described in conjunction with FIGS. 3 and 4. Input/output line 18 can be any connection, wired or wireless, that permits the transfer of data between controller 16 and display 20. Input/output line 18 can be a connection over a local or wide area network to allow for the remote viewing of processing data.

Display 20 may be a display integrated as part of a control console that can include controller 16 for process tool 12. In this embodiment, control information may be sent back to process tool 12 via controller 16. Display 20 may be a conventional cathode ray tube (CRT) monitor, a liquid crystal display (LCD) or plasma monitor, a printer capable of graphical output and the like.

Display 20 may also be coupled to a simulator of a process tool 12. The simulator generates simulation data regarding the processing of a work piece using a simulation program, running on a computer. The simulation data would then be displayed using a novel graphical representation as discussed in greater detail below. In another embodiment, the simulation data can be generated using a combination of a simulation program running on a computer and manual steps.

Figure 2:
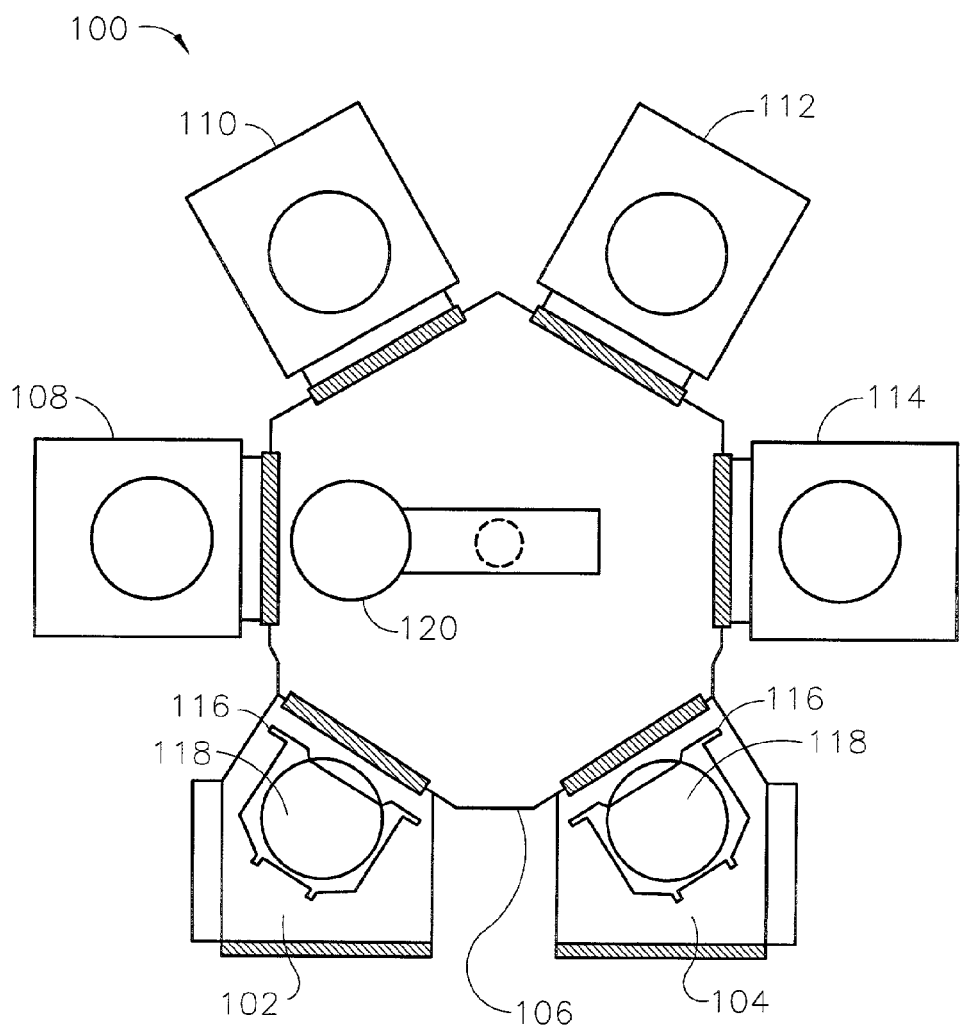
FIG. 2 is a schematic drawing of a cluster tool.

An example of a process tool 12 is shown in FIG. 2. FIG. 2 is a schematic diagram of a cluster tool 100. Cluster tool 100 is one of many possible process tools 12 that can be used with the present invention and are well known in the art. Cluster tool 100 includes a number of process stations coupled to a central wafer-handling chamber 106. In an exemplary system process stations include a first input/output chamber 102 and a second input/output chamber 104 coupled to a central wafer-handling chamber 106. Also included are a HF etching station 108, a staging station 110, an oxidation station 112, and a low-pressure chemical vapor deposition (LPCVD) station 114. Each process station, as well as the wafer-handling chamber 106, may be equipped with sensors (not \pictured) that can indicate the presence or removal of wafers 118. While FIG. 2 shows a specific configuration of a cluster tool 100, other configurations may be used in conjunction with the present invention.

First input/output station 102 and second input/output station 104 each hold one or more carriers 116. Each carrier 116 holds a plurality of wafers 118. In one embodiment each input/output chamber 102, 104 holds two carriers 116 stacked on top of each other. Each carrier 116 holds twenty-five wafers 118 per carrier 116. Thus, a total of one hundred wafers 118 can be processed in one group or batch through cluster tool 100. First input/output chamber 102 and second input/output chamber 104 include sensors that detect the presence of carriers 116. Carriers 116 can be scanned by using well-known techniques to determine which slots of the carrier 116 wafers 118 occupy.

Wafer handling chamber (WHC) 106 includes a robot arm 120. Robot arm 120 moves wafers 118 from carriers 116 to the process stations 108–114. Robot arm 120 also moves wafers between stations 108–114. Wafer handling chamber 106 and robot arm 120 are conventional parts of a wafer processor machine. Robot arm 120 may also include a sensor (not pictured) for detecting the presence or absence of wafers 118 on robot arm 120. The sensors associated with robot arm 120 can be used to track the insertion or removal of wafers 118 from a process station, which in turn tracks the movement of wafers 118 throughout cluster tool 100.

HF etching station 108 is coupled to wafer handling chamber 106. In a typical embodiment, HF etching station 108 can process twenty-five wafers 118 at a time. The HF etching station 108 uses hydrogen fluoride to clean the surface of the wafers 118. Staging station 110 holds the wafers between certain processing steps. Oxidation station 112 is also coupled to wafer handling chamber 106. In oxidation station 112 a thin layer of oxide is formed over the surface of wafers 118. LPCVD station 114 is coupled to wafer handling chamber 106. LPCVD station 114 applies layers on to the surface of the wafer 118 such as a layer of silicon nitride for passivation or other purposes. All of these process stations are conventional process stations well known in the design of cluster tools. Each process station may also include sensors to determine the number of wafers 118 present at each process station. While FIG. 2 illustrates the use of certain process stations, other stations can be used with the present invention.

In operation, in one embodiment, first input/output chamber 102 and second input/output chamber 104 each have two carriers 116 with twenty-five wafers 118 per carrier 116. The total amount of wafers 118 that will be processed together is known as a batch. In the embodiment described, one batch is one hundred wafers 118. Initially, robot arm 120 in wafer handling chamber 106 moves wafers 118 from one of the carriers 116 of input/output chamber 102 to HF etching station 108 where wafers 118 are etched. HF etching station 108, in one embodiment, can etch twenty-five wafers 118 at a time. After twenty-five wafers 118 are etched, they are transported by robot arm 120 to staging station 110. Then, another twenty-five wafers 118 are transferred by robot arm 120 from one of the input/output chambers 102, 104 to HF etching station 108 for an HF etch. This continues until all wafers 118 in carriers 116 are processed through HF etching station 108 and transferred to staging station 110.

After all wafers 118 have been processed in HF etching station 108 and placed in staging station 110, they are transferred by robot arm 120 to oxidation station 112. In one embodiment, oxidation station 112 holds and oxidizes one hundred wafers 118 simultaneously.

After the oxidation process is complete, wafers 118 are transferred by robot arm 120 from oxidation station 112 to LPCVD station 114 where a layer of silicon nitride or other material is deposited onto the wafers 118. In one embodiment, LPCVD station 114 holds and processes one hundred wafers 118 simultaneously. After the LPCVD process is complete, wafers 118 are transferred back to staging chamber 110. After sufficient cool-down, wafers 118 are transferred from staging station 110 back to input/output chambers 102 and 104. While specific process stations are shown in FIG. 2, these are used as illustrations only and any process station can be used. Additionally, although a cluster tool 100 is illustrated in FIG. 2, the present invention can be used for a variety of processing environments in which one or more work pieces are processed through various process stations.

Figure 3:
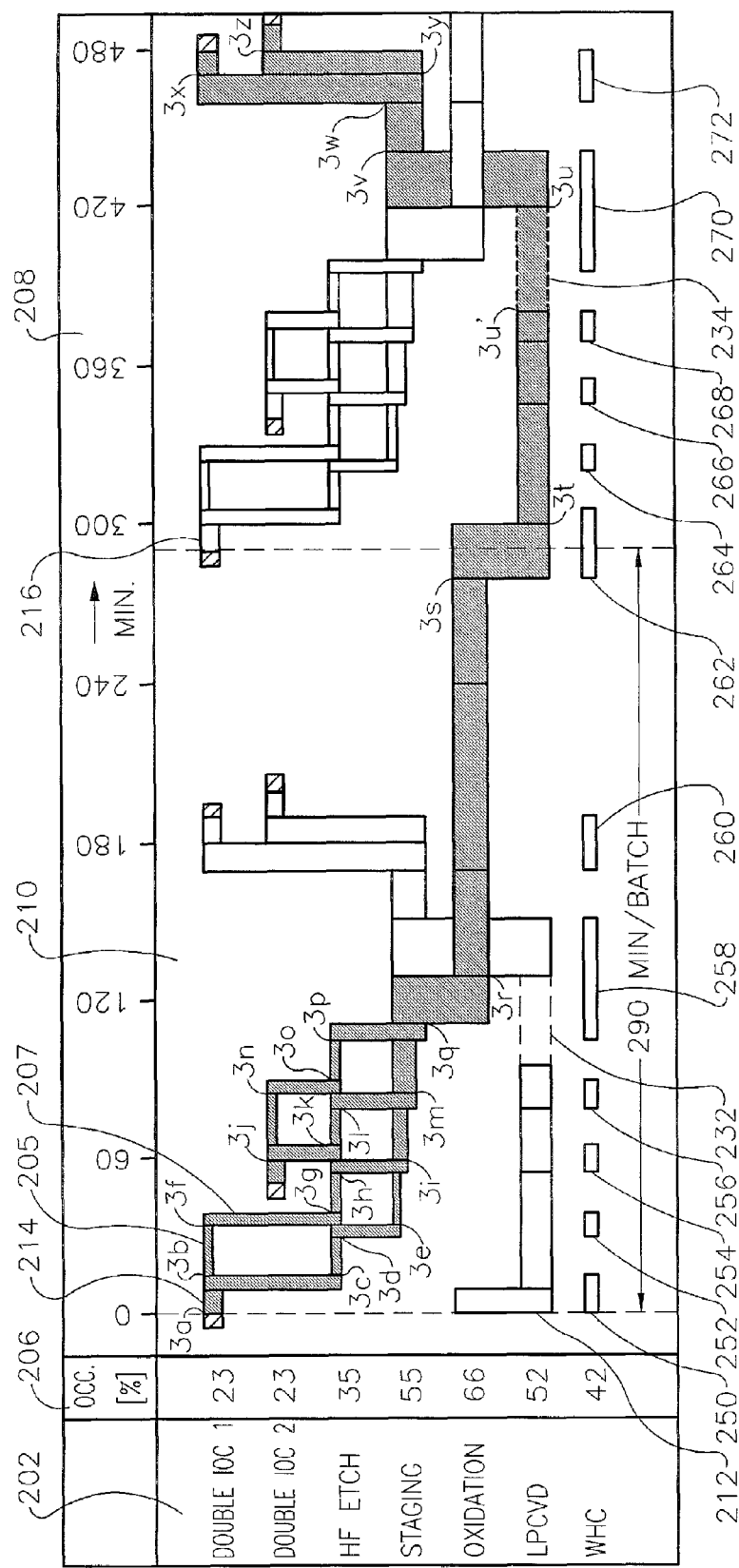
FIG. 3 is a drawing of an exemplary graphical representation of processes in a cluster tool.

FIG. 3 illustrates a graphical display 200 that graphically depicts the progress of wafers being processed in a process tool 12, such as cluster tool 100. Graphical display 200 is displayed on display 20. Display 20 may be coupled to a process tool 12, such as cluster tool 100 for observation by an operator of the process tool 12. Alternatively, graphical display 200 may be displayed on a display 20 coupled to a computer running a simulation of a cluster tool 100. Also, graphical display 200 can be generated manually using, in one embodiment, conventional drawings or computer aided design (CAD) software such as VISIO by Microsoft. Manual generation of graphical display 200 is useful when an operator is initially defining the optimal configuration of a cluster tool 100 or the like.

A process station area 202 is included in graphical display 200. In the embodiment shown in FIG. 3 process station area 202 includes the name of each process station in cluster tool 100 listed in a column. Process station area 202 forms an axis of the graphical display 200. An occupancy area 206 is included in graphical display 200, typically adjacent to process station area 202 and is used to indicate the occupancy of a process station as a percentage of time where 100% occupancy means that a process station is occupied all the time. In an optimum configuration, all process stations will have similar occupancy. When each station has similar occupancy there are no bottlenecks in the process. A time scale area 208 is included in graphical display 200.

Time scale area 208 includes time increments and provides a second axis for graphical display 200. In FIG. 3, time scale area 208 is aligned along a horizontal axis. The time increments typically are listed in increments of minutes, although other time scales can be used.

A graph area 210 is included in graphical display 200. Graph area 210 may include one or more graphical representations of a process, such as the movement and processing of a batch of wafers through the cluster tool. In FIG. 3 there is a first graph 212, a second graph 214 and a third graph 216. Only second graph 214 is shown in its entirety. To distinguish between multiple graphs different colors or shading schemes can be used for each different graph.

First graph 212; second graph 214 and third graph 216 comprise a series of horizontal line segments 205 and vertical line segments 207 of varying thickness. In one embodiment the horizontal line segments 205 and vertical line segments 207 are connected. The length of the horizontal line segments 205 represents the amount of time wafers spend in a process station. The vertical thickness of the horizontal line segments 205 is indicative of the number of wafers in a process station at a given time. The thicker the horizontal line segment 205, the more wafers present.

The length of the vertical line segments 207 represent the transfer of wafers from one process station to another process station. The horizontal width of the vertical line segment 207 represent the amount of time it takes to complete the transfer. While FIG. 3 has the time scale along a horizontal direction and the process stations listed in a vertical direction, different orientations can be used.

Turning to the second graph 214 and using the cluster tool 100 of FIG. 2 as an exemplary process tool 12, a quantity of wafers 118 are initially loaded into first input/output chamber 102 and second input/output chamber 104. In one embodiment, first input/output chamber 102 and second input/output chamber 104 each hold fifty wafers 118 in two carriers 116 of twenty-five wafers 118 each. The initial condition for first input/output chamber 102 is depicted as point 3a of second graph 214. The thickness of the horizontal line segment 205 at this point is proportional to the number of wafers 118 in the first input/output chamber 102. At point 3b, the wafers 118 of one of the two carriers 116 of first input/output chamber 102 are transferred by robot arm 120 to HF etching station 108. The HF etching station 108 initiates its etching process at point 3c. The thickness of the vertical line segment 207 from point 3b to point 3c represents the amount of time needed to transfer the wafers 118 of carrier 116 from first input/output chamber 102 to HF etching station 108. The vertical line segment 207 from point 3b to 3c represents the transfer of wafers from one process station to another. At point 3b the horizontal line segment 205 representing the presence of wafers 118 in first input/output chamber 102 is connected to the vertical line segment 207 representing the initiation of the transfer of wafers 118 to HF etching station 108. Point 3c represents the end of the transfer of wafers 118 to the HF etching station 108. Point 3d indicates where the HF etching process ends for the wafers 118 of the first carrier 116 of first input/output chamber 102. After the HF process ends for wafers 118 of the first carrier 116 of first input/output chamber 102, these wafers 118 are transferred to staging station 110. Line segment 3d to 3e illustrates the transfer of these wafers 118 from HF etching station 108 to staging station 110.

The wafers 118 of the second carrier 116 of first input/output chamber 102 are transferred starting at point 3f and ending at point 3g to HF etching station 108. The wafers 118 of second carrier 116 of first input/output chamber 102 are in HF etching station 108 from the time between points 3g to 3h. Then, from point 3h to point 3i wafers 118 of the second carrier 116 of first input/output chamber 102 are transferred to staging station 110. Note that at point 3i the thickness of the horizontal line segment increases, indicating that twice as many wafers 118 are in staging station 110 after wafers 118 of the second carrier 116 of first input/output chamber 102 are transferred to staging station 110.

Turning now to second input/output chamber 104, at point 3j wafers 118 in first carrier 116 of second input/output chamber 104 start the transfer process from the second input/output chamber 104 to HF etching station 108. At point 3k the transfer finishes. The wafers 118 of second input/output chamber 104 are in HF etching station 108 from the time between points 3k to 3l. Then, from point 3l to point 3m wafers 118 from first carrier 116 of second input/output chamber 104 are transferred to staging station 110. Note that at point 3m the thickness of the horizontal line segment increases over that at point 3i, indicating that more wafers 118 (in the example seventy-five wafers 118) are in staging station 110.

The wafers 118 of the second carrier 116 of second input/output chamber 104 are transferred starting at point 3n and ending at point 3o to HF etching station 108. Wafers 118 of second carrier 116 of second input/output chamber 104 are in HF etching station 108 from the time between point 3o to 3p. Then, from point 3p to point 3q wafers 118 of the second carrier 116 of second input/output chamber 102 are transferred to staging station 110.

After all wafers 118 are in staging station 110, they are transferred, starting at point 3q, to oxidation station 112 by robot arm 120, where an oxidation process starts at point 3r. All of the wafers 118 are transferred to oxidation station 112 at point 3r. At oxidation station 112, wafers 118 undergo an oxidation process that last from point 3r to 3s. At point 3s, robot arm 120 transfers all wafers 118 from oxidation station 112 to LPCVD station 114, which starts at point 3t. The line segment between point 3t and point 3u represents the amount of time wafers 118 spend in LPCVD station 114. The actual process time in LPCVD station 114 is denoted as the length of the line segment between 3t and 3u'. The time between 3u' and 3u represents the time the wafers are in LPCVD station 114 but are not able to leave the station because wafer handling chamber 106 is in use. At point 3u, wafer handling chamber 106 is available and the wafers 118 are transferred back to staging station 110. The transfer process last from point 3u to 3v. All of wafers 118 are transferred back to staging station 110. Then, beginning at point 3w and ending at point 3x, wafers 118 are transferred back to carriers 116 in first input/output chamber 102. After that, beginning at point 3y to point 3z, the remaining wafers 118 are transferred to two carriers 116 in second input/output chamber 104.

From second graph 214 various process parameters can be determined. For example at time=0 the processing of wafers for second graph 214 initiates. At time=490 minutes the processing of wafers for second graph 214 finishes. Thus, the total amount of time wafers 118 are in cluster tool 100 is 490 minutes. The time the wafers 118 are in the cluster tool 100 is known as the cycle time for the system. Additionally, the length of the vertical line segments in the horizontal direction indicates the amount of time wafers 118 are in a specific processing module. Also, the thickness of horizontal line segments represents the number of wafers present at a process station. The horizontal line segments and vertical line segments can be connected to each other to show a continuous process.

Also illustrated in graph area 210 is first graph 212. At time=0, first graph 212 shows the movement of wafers 118 from oxidation station 112 to LPCVD station 114. Note that at approximately time=110, there is a dotted box 232 in the horizontal line segment representing the LPCVD process of the first graph 212. Dotted box 232 represents wafers 118 that have completed the LPCVD process but are still in the LPCVD station 114 because the wafers 118 cannot be unloaded. The wafers 118 illustrated in first graph 212 cannot be unloaded because robot arm 120 is occupied moving wafers associated with the process shown in second graph 214. Note that at the time when dotted box 232 exists in first graph 212, the wafers 118 associated with the second graph 214 are either being loaded into the staging station 110 or are being transferred from the staging station 110 during the time the wafers 118 associated with first graph 212 are waiting in the LPCVD station 114. The dotted box 232 allows an operator to see where a process in one batch is holding up another process for another batch.

Also illustrated is a third graph 216, which initiates at t=290. Wafer transfer for third graph 216 initiates once all the wafers in second graph 214 are transferred to the LPCVD station 114 at point 3t. The number of wafers in a batch divided by the time elapsed between the initiation of processing for one batch of wafers and the initiation of processing for a second batch of wafers is the throughput. In the example in FIG. 3 the throughput is 100 wafers divided by 290 minutes, or 0.344 wafers/minute, which is equivalent to 20.7 wafers/hour.

To maximize the use of resources, new carriers 116 with wafers 118 should be loaded into the first input/output chamber 102 and second input/output chamber 102 as soon as possible. In the above example, turning to second graph 214, as soon as the last wafer 118 is loaded into the HF station 108 it would be desirable to load new carriers 116 with new wafers 118 into the first and second input/output chamber 102, 104. In the example of FIG. 3, the last wafer 118 of the second graph 214 is loaded into HF etching station 108 at point 3o at approximately 95 minutes into the process. However, new carriers 116 of wafers 118 can not be loaded into first input/output chamber 102 and second input/output chamber 104 at the 95 minute point because there is not enough time to transfer these wafers out of the carriers before the wafers of the previous batch illustrated in second graph 214 need to be loaded back into carriers of first input/output chamber 102 and second input/output chamber 104 (starting at about 173 minutes and ending at about 190 minutes). From the second graph 214 it can be determined that it takes approximately 95 minutes to fully unload the carriers in both first and second input/output chamber 102 and 104. From the first graph 212 it can be seen that the last wafer 118 is loaded back into the second input/output chamber 104 at about 190 minutes. If new cassettes are to be loaded immediately after the wafers 118 of second graph 214 are transferred out of first and second input/output chamber 102 and 104 at point 3o and before the wafers are transferred back to the carriers for first graph 212, the new cassettes must be in place and all wafers removed within 95 minutes. However, of those 95 minutes, during approximately 45 minutes robot arm 120 is busy transferring wafers from HF etching station 108 to staging station 110 and from staging station 110 to oxidation station 112 for second graph 214 and to transfer wafers from LPCVD station 114 to staging station 110 for first graph 212. This leaves only 50 minutes to transfer new wafers 118 from the first and second input/output chambers 102 and 104 to the HF etching station 118, which is not possible. Thus, new carriers of wafers cannot be loaded into first and second input/output chamber 102 and 104 until there is time to start the processing. This occurs at about 290 minutes, where third graph 216.

The above discussion illustrates how the present invention can be used as an analytical tool. In a manual embodiment, a user could manually layout a complete process using a drawing program such as VISIO by Microsoft Inc., of Redmond Wash. Then, based on the knowledge of the processes and the constraints formed by the initial graph, the user could overlay other graphs representing the starting of a new process cycle. The user might determine that certain waiting periods, such as point 232 of first graph 212 needs to be added. In this way the user can form prototypes of potential wafer process station uses. Similar planning can be done if the graphing is done automatically using a simulation of cluster tool 100 or the data from an actual cluster tool 100. In case of an actual process being captured in real time, the graphs represent what is actually happening in the system. Once the graph of one batch is determined, it can be examined to determine when a new batch can be initiated. Also, it can be examined for places where potential bottlenecks may occur.

Also illustrated in process station area 202 of graphical display 200 is a row for the wafer handling chamber. Associated with the row for the wafer-handling chamber 106 is a plurality of wafer handling indicators 250–272. The position of the indicators represent when the wafer-handling chamber is in use. The wafer-handling chamber 106 is in use when wafers 118 are being transferred from one process station to another. For example, indicator 358 represents wafer handling chamber 106 being used for second graph 214 to transfer wafers 118 from HF etching station 108 to staging station 110 and from staging station 110 to oxidation station 112 and for the use of wafer handling station 106 to transfer wafers 118 from LPCVD station 114 to staging station 110 as seen in first graph 212. The wafer handling indicators 250–272 provide an operator with the ability to see when the wafer-handling chamber 106 is being used for planning purposes.

Figure 4:
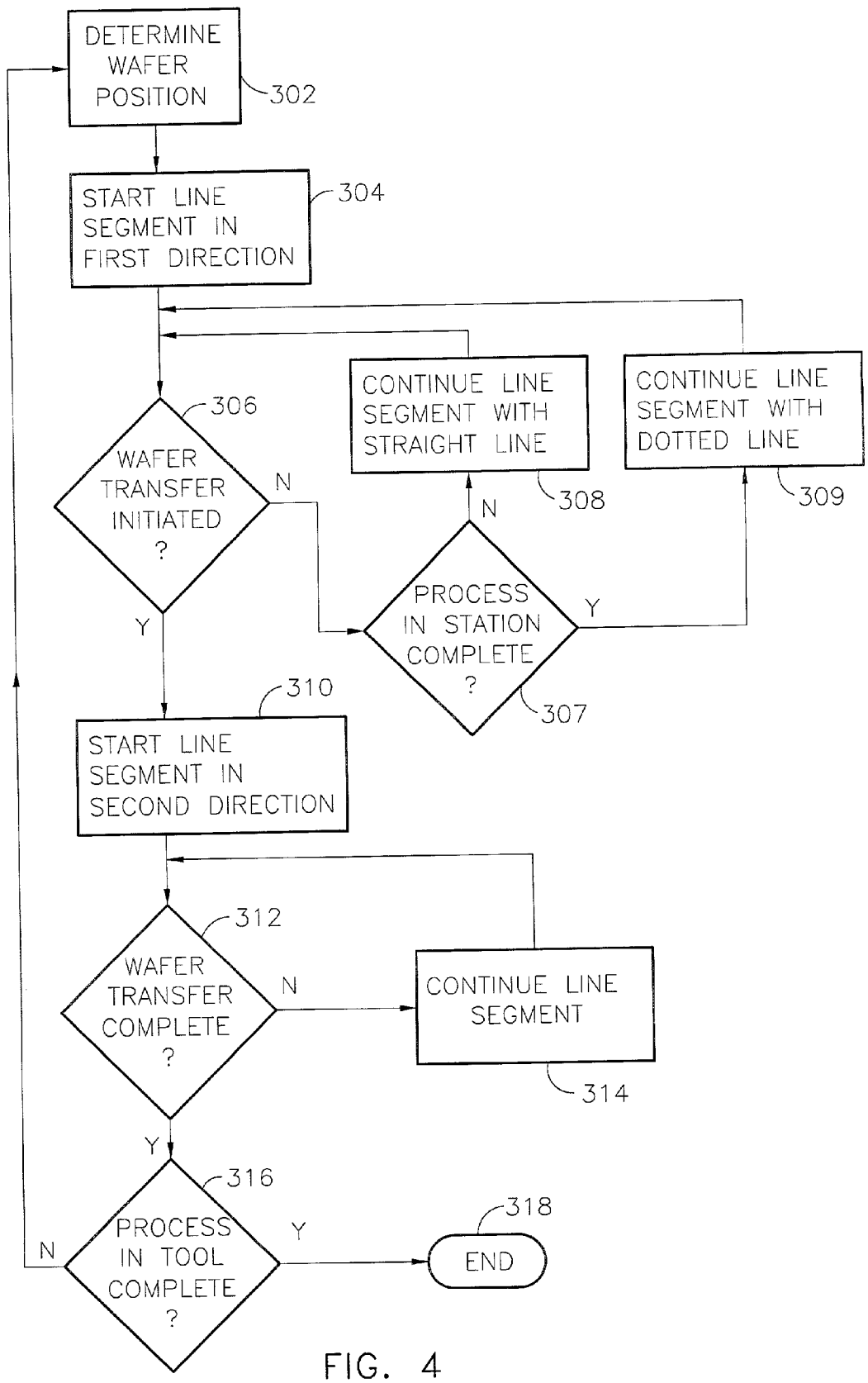
FIG. 4 is a flow chart illustrating steps in the generation of the graphical representation.

FIG. 4 is a flowchart illustrating the generation of a graphical representation of a semiconductor process. In step 302 it is determined where the wafers 118 are located. This can be accomplished using various sensors in the process stations. At the start of a process, wafers 118 are initially in carriers 116 in first input/output chamber 102 and second input/output chamber 104. As an alternative for detecting the wafer locations by sensors, it is possible to start with a known starting condition and keep track of the wafer movements and locations through the cluster tool controller. In most practical situations, a combination of sensing and tracking will be applied. Sensing the presence of each wafer in each input/output chamber is standard practice in cluster tools. Sensing the presence of a wafer at other locations depends on the complexity and feasibility of such sensing. In high temperature stations and batch stations it is practically impossible to sense the location of each wafer present in the station. However, sensing each wafer upon insertion into or withdrawal from the station is easier to carry out. By keeping track of the wafer transfers inside the station the position of all the wafers inside the station can be known.

After determining the location of the wafers, in a next step 304, the drawing of a line segment in a first direction is initiated. The line segment in one embodiment is a horizontal line segment. The thickness of the line segment is representative of the number of wafers in the process station. The length of the line segment represents the time spent in a process station. The position of the line segment along a vertical axis is representative of the location of the wafers.

In a next step 306, it is determined if wafers 118 remain are still residing in a process station or if wafers 118 are transferring out of a process station. If transfer of the wafers 118 has not been initiated, it is determined in step 307 if the process in the process station has been completed. If not, in step 308 the line segment in the first direction is continued with a straight line. If the process in the station has been completed, in step 309 the line segment in the first direction is continued with a dotted line to indicate that the process is completed but transfer of the wafers 118 has not initiated.

If transfer of wafers 118 has been initiated, in step 310 a second line segment in a second direction is initiated. The second line segment, in one embodiment, is connected with and perpendicular to the line segment in the first direction. In one embodiment, the line segment extends in a vertical direction. The width of the line segment represents the amount of time it takes to transfer the wafers from one process station to another. The starting position of the line segment in the vertical direction represents the starting location of the transfer at a first process station and the end portion represents the destination location at another process station. In step 312, it is determined if the transfer is complete. If the transfer is not complete, then, in step 314, the line segment continues to be generated. If the transfer is complete, in step 316 it is determined if the overall process is complete. If the process is complete then the line of the overall process terminates in step 318. If the process is not complete, then the generation of a new line segment in a first direction is initiated in step 304. Then new line segment will be connected to the second line segment.

Having now described preferred embodiments of the invention modifications and variations may occur to those skilled in the art. The invention is thus not limited to the preferred embodiments, but is instead set forth in the following clauses and legal equivalents thereof.

What is claimed is:

1. A method for generating a graphical representation of a processing system in which one or more work pieces are processed in a number of process stations comprising:

forming a first line segment in a first direction, the first line segment indicating the time one or more work pieces spends in a first process station; and forming a second line segment connected to the first line segment in a second direction, the second line segment representing the transfer of the one or more work pieces from the first process station to a second process station.

2. The method of claim 1 wherein the step of forming a first line segment further comprises forming a first line segment wherein the thickness of the line segment represents the number of work pieces in the first process station.

3. The method of claim 1 wherein the step of forming a second line second comprises forming a second line segment wherein the thickness of the second line segment represents the time taken to transfer the work pieces between the first process station and the second process station.

4. The method of claim 1 further comprising the step of forming additional line segments in a first direction to represent time work pieces spend in additional process stations.

5. The method of claim 1 further comprising the step of forming additional line segments in a second direction to represent the transfer of work pieces from one process station to another process station, the additional vertical lines connecting an end of processing in one process station and a beginning of processing in another process station.

6. The method of claim 1, further comprising using a different color to represent work pieces belonging to a different batch.

7. The method of claim 1 wherein the step of forming a first line segment and the step of forming a second line segment further comprises forming a first line segment in response to data generated by a processing tool and forming a second line segment in response to data generated by the processing tool.

8. The method of claim 1 wherein the step of forming a first line segment and the step of forming a second line segment further comprises forming a first line segment in response to data generated by a simulator and forming a second line segment generated by a data generated by a simulator.

9. The method of claim 1 further comprising generating additional graphical representations of a processing system for a different batch of work pieces.

10. A method for graphically representing the progress of one or more wafers being processed in a plurality of process stations comprising:
    determining the start of a first process performed on one or more wafers in one of the plurality of process stations;
    initiating the generation of a first line segment in a first direction corresponding to the start of the process in one of the plurality of process stations;
    determining the end of the first process in one of the plurality of process stations;
    terminating the first line segment;
    determining the start of a transfer of one or more wafers from one of the plurality of process stations to another one of the plurality of process stations;
    initiating the formation of a second line segment in a second direction substantially perpendicular to the first line segment and connected to the first line segment;
    determining the completion of the transfer of the one or more wafers;
    terminating the formation of the second line segment; and
    repeating the step of determining the start of a process.

11. The method of claim 10 wherein the step of initiating the generation of a line segment further comprises initiating the generation of a line segment wherein the thickness of the line segment is indicative of the number of wafers in the first process station.

12. The method of claim 10, wherein the step of initiating the formation of a line segment substantially perpendicular to the first axis comprises initiating the formation of a line segment substantially perpendicular to the first axis wherein the thickness of the second line segment is proportional to the time taken to transfer the wafers.

13. The method of claim 10, wherein the wafers are contained in one or more carriers.

14. The method of claim 13 further comprising using a different color to represent wafers belonging to a different batch of wafers.

15. The method of claim 10 wherein the process stations are part of a cluster tool.

16. A display coupled to a controller for showing a graphical representation of a process involving a plurality of process stations in the manufacture of one or more work pieces comprising:
    a graph area to display the graphical representation, the graphical representation comprising:
        a plurality of line segments in a first direction, the length of the line segments in the first direction indicative of the time one or more work pieces spend in one of the plurality of process stations; and
        a plurality of line segments in a second direction, the line segments in the second direction connecting the line segments in the first direction, the line segments in the second direction representing the transfer of one or more work pieces from one of the plurality of process stations to another one of the plurality of process stations.

17. The display of claim 16 wherein two or more graphical representations are included in the graph area, each of the graphical representation representing the processing of a different batch of work pieces.

18. The display of claim 17 wherein each graphical representation is displayed using a different color or shading.

19. The display of claim 16 wherein the graphical representation is formed in response to data generated by a processing tool.

20. The graphical display of claim 16 wherein the graphical representation is formed in response to data generated by a simulator.

21. A manufacturing system comprising:
    a process tool having a plurality of process stations that perform manufacturing steps on a plurality of work pieces;
    a controller coupled to the process tool to send control commands to the process tool;
    a display coupled to the controller, the display receiving data from the controller regarding the processing of the plurality of work pieces in the process tool, the display having a graph area to display a graphical representation of the processing of the work pieces, the graphical representation comprising:
        a plurality of line segments in a first direction, the length of the line segments in the first direction indicative of the time one or more work pieces spend in one of the plurality of process stations; and
        a plurality of line segments in a second direction, the line segments in the second direction connecting the line segments in the first direction, the line segments in the second direction representing the transfer of one or more work pieces from one of the plurality of process stations to another one of the plurality of process stations.

22. The system of claim 21 wherein two or more graphical representations are included in the graph area, each of the graphical representation representing the processing of a different batch of work pieces.

23. The system of claim 22 wherein each graphical representation is displayed using a different color or shading.

24. The system of claim 21 wherein the graphical representation is formed in response to data generated by a processing tool.

25. The system of claim 21 wherein the graphical representation is formed in response to data generated by a simulator.

26. A semiconductor wafer manufacturing system comprising:
- a cluster tool having a plurality of process stations that perform manufacturing steps on a plurality of semiconductor wafers;
- a controller coupled to the cluster tool to send control commands to the cluster tool;
- a display coupled to the controller, the display receiving data from the controller regarding the processing of the plurality of semiconductor wafers in the process tool, the display having a graph area to display a graphical representation of the processing of the semiconductor wafers, the graphical representation comprising:
- a plurality of line segments in a first direction, the length of the line segments in the first direction indicative of the time one or more semiconductor wafer spend in one of the plurality of process stations; and
- a plurality of line segments in a second direction, the line segments in the second direction connecting the line segments in the first direction, the line segments in the second direction representing the transfer of one or more semiconductor wafer from one of the plurality of process stations to another one of the plurality of process stations.

27. The system of claim 26 wherein two or more graphical representations are included in the graph area, each of the graphical representation representing the processing of a different batch of wafers.

28. The system of claim 27 wherein each graphical representation is displayed using a different color or shading.

29. The system of claim 26 wherein the graphical representation is formed in response to data generated by a simulation of a cluster tool.

30. A program product comprising:
- a computer readable storage medium for storing instructions that, when executed by a computer causes the computer to perform a method for generating a graphical representation of a processing system in which one or more work pieces are processed in a number of process stations comprising:
- computer readable program code for forming a first line segment in a first direction, the first line segment indicating the time one or more work pieces spends in a first process station; and
- computer readable program code for forming a second line segment connected to the first line segment in a second direction, the second line segment representing the transfer of the one or more work pieces from the first process station to a second process station.

31. The program product of claim 30 wherein the computer readable program code for forming a first line segment further comprises computer readable program code for forming a first line segment wherein the thickness of the line segment represents the number of work pieces in the first process station.

32. The program product of claim 30 wherein the computer readable program code for forming a second line second comprises computer readable program code for forming a second line segment wherein the thickness of the second line segment represents the time taken to transfer the work pieces between the first process station and the second process station.

33. The program product of claim 30 further comprising computer readable program code for forming additional line segments in a first direction to represent time work pieces spend in additional process stations.

34. The program product of claim 30 further comprising computer readable program code for forming additional line segments in a second direction to represent the transfer of work pieces from one process station to another process station, the additional vertical lines connecting an end of processing in one process station and a beginning of processing in another process station.

35. The program product of claim 30 further comprising computer readable program code for using a different color to represent work pieces belonging to a different batch.

36. The program product of claim 30 wherein the computer readable program code for forming a first line segment and the computer readable program code for forming a second line segment further comprises computer readable program code for forming a first line segment in response to data generated by a processing tool and computer readable program code for forming a second line segment in response to data generated by the processing tool.

37. The program product of claim 30 wherein the computer readable program code for forming a first line segment and the computer readable program code for forming a second line segment further comprises computer readable program code for forming a first line segment in response to data generated by a simulator and computer readable program code for forming a second line segment generated by a data generated by a simulator.

38. The program product of claim 30 further comprising computer readable program code for generating additional graphical representations of a processing system for a different batch of work pieces.

* * * * *